United States Patent [19]

Sicher

[11] Patent Number: 5,570,411
[45] Date of Patent: Oct. 29, 1996

[54] CALL PRIORITY IN A MOBILE RADIOTELEPHONE SYSTEM

[75] Inventor: Alan Sicher, Garland, Tex.

[73] Assignee: Telefonaktiebolaget LM Ericsson, Stockholm, Sweden

[21] Appl. No.: 278,252

[22] Filed: Jul. 20, 1994

Related U.S. Application Data

[63] Continuation of Ser. No. 226,366, Apr. 12, 1994, abandoned, which is a continuation of Ser. No. 842,557, Feb. 27, 1992, abandoned.

[51] Int. Cl.⁶ .................. H04Q 7/08; H04Q 7/20
[52] U.S. Cl. .............. 379/57; 340/825.08; 379/58; 379/60; 455/33.2; 455/34.1; 455/56.1
[58] Field of Search ................. 379/56, 57, 58, 379/60, 61, 62; 455/33.1, 33.2, 34.1, 56.1, 166.1; 340/825.08

[56] References Cited

U.S. PATENT DOCUMENTS

| H610 | 3/1989 | Focarile et al. | 379/60 |
|---|---|---|---|
| Re. 32,789 | 11/1988 | Lynk, Jr. et al. | 379/58 |
| 3,806,804 | 4/1974 | Mills et al. | 325/55 |
| 4,320,523 | 3/1982 | Horikawa et al. | 375/103 |
| 4,661,972 | 4/1987 | Kai | 379/57 |
| 4,670,899 | 6/1987 | Brody et al. | 379/60 |
| 4,716,407 | 12/1987 | Borras et al. | 340/825.04 |
| 4,794,635 | 12/1988 | Hess | 379/60 |
| 4,977,589 | 12/1990 | Johnson et al. | 379/58 |
| 5,073,971 | 12/1991 | Schaeffer | 455/33 |
| 5,088,108 | 2/1992 | Uddenfeldt et al. | 375/12 |
| 5,132,680 | 7/1992 | Tezuka et al. | 340/825.08 |
| 5,153,902 | 10/1992 | Buhl et al. | 379/57 |
| 5,197,093 | 3/1993 | Knuth et al. | 379/61 |
| 5,249,304 | 9/1993 | Mulford | 455/34.1 |
| 5,280,630 | 1/1994 | Wang | 455/56.1 |
| 5,301,356 | 4/1994 | Bodin et al. | 455/33.2 |
| 5,349,632 | 9/1994 | Nagashima | 379/61 |
| 5,371,780 | 12/1994 | Amitay | 379/58 |

FOREIGN PATENT DOCUMENTS

| 0 545 533 | 6/1993 | European Pat. Off. . | |
| 3516357 | 11/1986 | Germany | 379/60 |
| 2246490 | 1/1992 | United Kingdom | 379/60 |

OTHER PUBLICATIONS

Hamada et al., "D–10 Land Mobile Telephone Switching Programs," *Review of The Electrical Communication Laboratories*, vol. 25, Nos. 11–12, Nov.–Dec. 1977.

K. Imamuara et al., "Software structure and performance evaluation for radio link control in medium capacity land mobile telephone system," *Electrical Communication Laboratories Technical Journal*, vol. 33, No. 9, pp. 2247–2258, 1984.

Engish abstract of Japanese Patent Application 01–51732, Feb. 1989.

Primary Examiner—Curtis Kuntz
Assistant Examiner—William Cumming
Attorney, Agent, or Firm—Burns, Doane, Swecker & Mathis, L.L.P.

[57] ABSTRACT

Call priority is realized in a mobile radio telephone system by ascertaining that a call should be given priority, assigning channels preferentially to a priority call, assigning higher quality channels preferentially to the priority call, and through-connecting the call. Call priority may also be realized by ascertaining that a call should be given priority, assigning channels preferentially to a priority call, allowing a more exhaustive paging for paging a mobile station than would be allowed if the call were not given priority, and through-connecting the call.

4 Claims, 6 Drawing Sheets

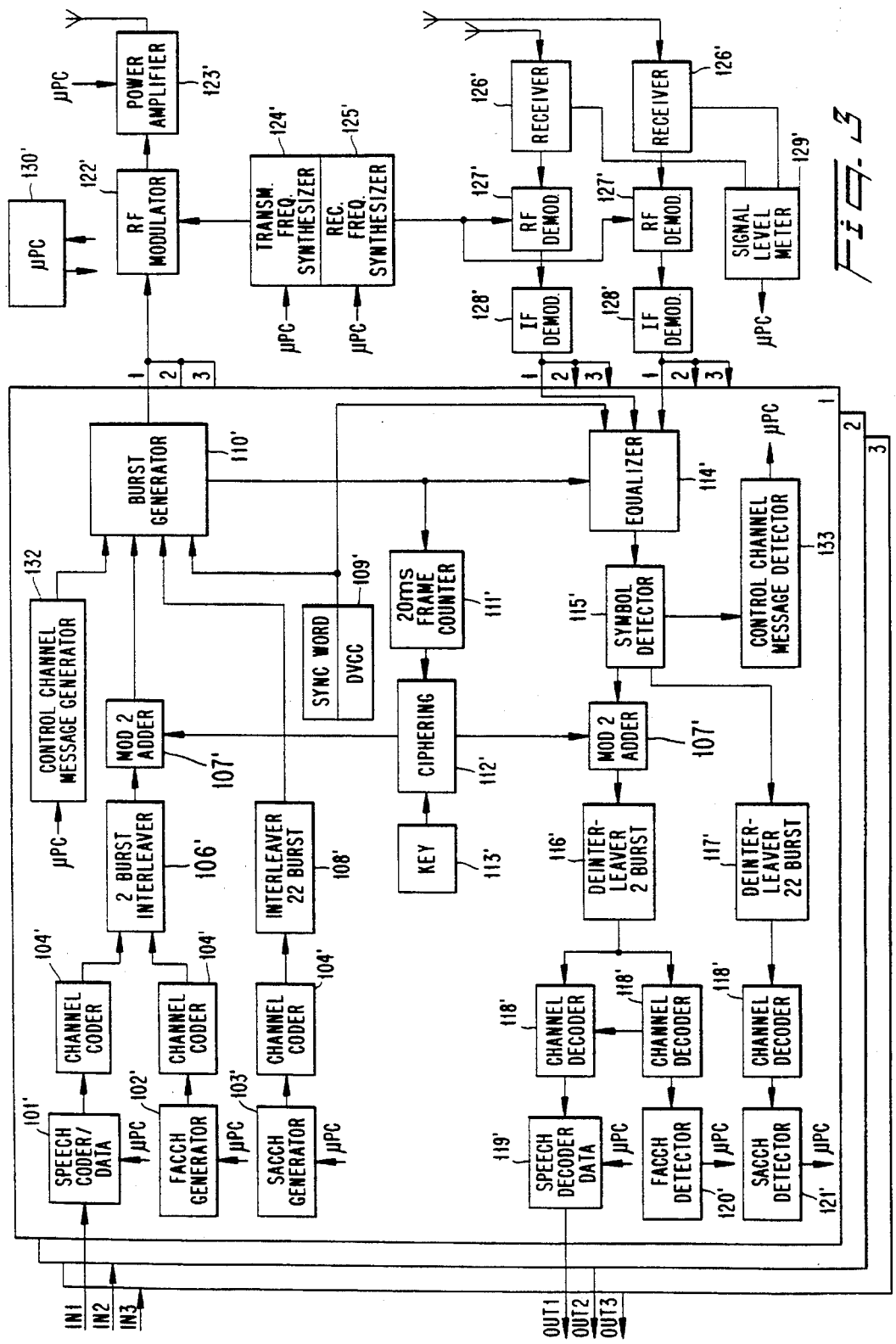

CALL PRIORITY IN A MOBILE RADIOTELEPHONE SYSTEM

This application is a continuation of application Ser. No. 08/226,366, filed Apr. 12, 1994, now abandoned, which is a continuation of application Ser. No. 07/842,557, filed Feb. 27, 1992 now abandoned.

BACKGROUND OF THE INVENTION

The present invention relates to mobile radiotelephone systems and more particularly to call priority in such systems.

A constant challenge facing mobile telephone engineers has been to provide a level of telephone service virtually indistinguishable from that available at a hard-wired telephone extension while operating under a fundamentally different set of conditions and assumptions. One service available in the "wire bound" telephone network has been user priority. In accordance with such priority, a call may, due to the category of a subscriber or the number dialed, be given priority when assigning resources in the network such as registers, cord circuits, trunk lines, paths through a selector, etc. Such a priority scheme becomes insufficient, however, in the fundamentally different mobile radio telephone environment.

Priorities arise from the necessity to manage competition for a limited resource. In a cellular mobile radiotelephone, competition occurs for making an access, being paged, and having a good voice channel or queuing (waiting) the least amount of time for one, among other things. These types of resource competitions should be managed effectively in the cellular mobile radiotelephone system according to the subscriber's own priority (urgency) to use the system/resource, and the system's priority to service the subscriber. Because to a large extent what is good for the subscriber is also good for the system, the system's priority should be a function of the subscriber's priority as well as relevant call and network specifics.

Call priority may be described as handling a call differently from similarly situated calls so as to perceptibly increase the quality of service of that call as compared to the other calls. High quality service may be described as: 1) certain call completion 2) with minimum delay 3) with good sound reproduction at both ends of the connection (or, in the case of data transmission, errorless transmission, in both directions in the case of duplex data exchange).

Certain call completion depends on the number of available circuits, minimum delay depends on quickly locating the mobile and then (possibly) routing efficiency and lack of congestion, and good sound reproduction depends on low-distortion transmission channels. In the wire-bound network, because of the vast size and advanced development of the network, at least in United States, certain call completion is rarely a problem. Furthermore, most lines are conditioned and tested to guarantee satisfactory sound reproduction.

In a mobile radiotelephone network, on the other hand, the number of available channels is much more limited, in part because the radio-frequency spectrum is a scarce resource and only a limited portion of that spectrum has been allocated to radiotelephone use. Furthermore, radio channels, even assuming fixed base stations, unavoidably vary in quality according to atmospheric conditions, and when the relative position of stations is time-varying (possibly quite rapidly) as in a mobile radiotelephone network, the variability of channel quality greatly increases. The main contributors to the variability of channel quality are co-channel and adjacent channel interference, and noise. Radio channels obviously cannot be conditioned in the same manner as wire lines.

An object of the present invention, therefore, is to provide call priority in a mobile radiotelephone network. More particularly, an object of the present invention is to provide in a mobile radiotelephone network for handling priority-designated calls differently from other concurrent calls so as to perceptibly increase the quality of service of the priority call by, to the extent possible, assuring call completion with good sound reproduction. Preferably, call completion is accomplished with minimal delay.

SUMMARY OF THE INVENTION

According to one aspect of the present invention, priority is realized in a cellular mobile radiotelephone system by ascertaining that a call should be given priority, assigning channels preferentially to a priority call, assigning higher quality channels preferentially to the priority call, and through-connecting (i.e., completing both-ways connection of) the call.

According to another aspect of the present invention, priority is realized by ascertaining that a call should be given priority, assigning channels preferentially to a priority call, allowing for more exhaustive paging of a mobile station than would be allowed if the call were not given priority, and through-connecting the call.

BRIEF DESCRIPTION OF THE DRAWINGS

These and other features and advantages of the invention will be readily apparent to one of ordinary skill in the art from the following written description, used in conjunction with the drawings, in which:

FIG. 3 illustrates a detailed block diagram of a base station that may be utilized in accordance with the present invention; and FIG. 4, including

DETAILED DESCRIPTION OF THE PREFERRED EMBODIMENTS

Figure 1:
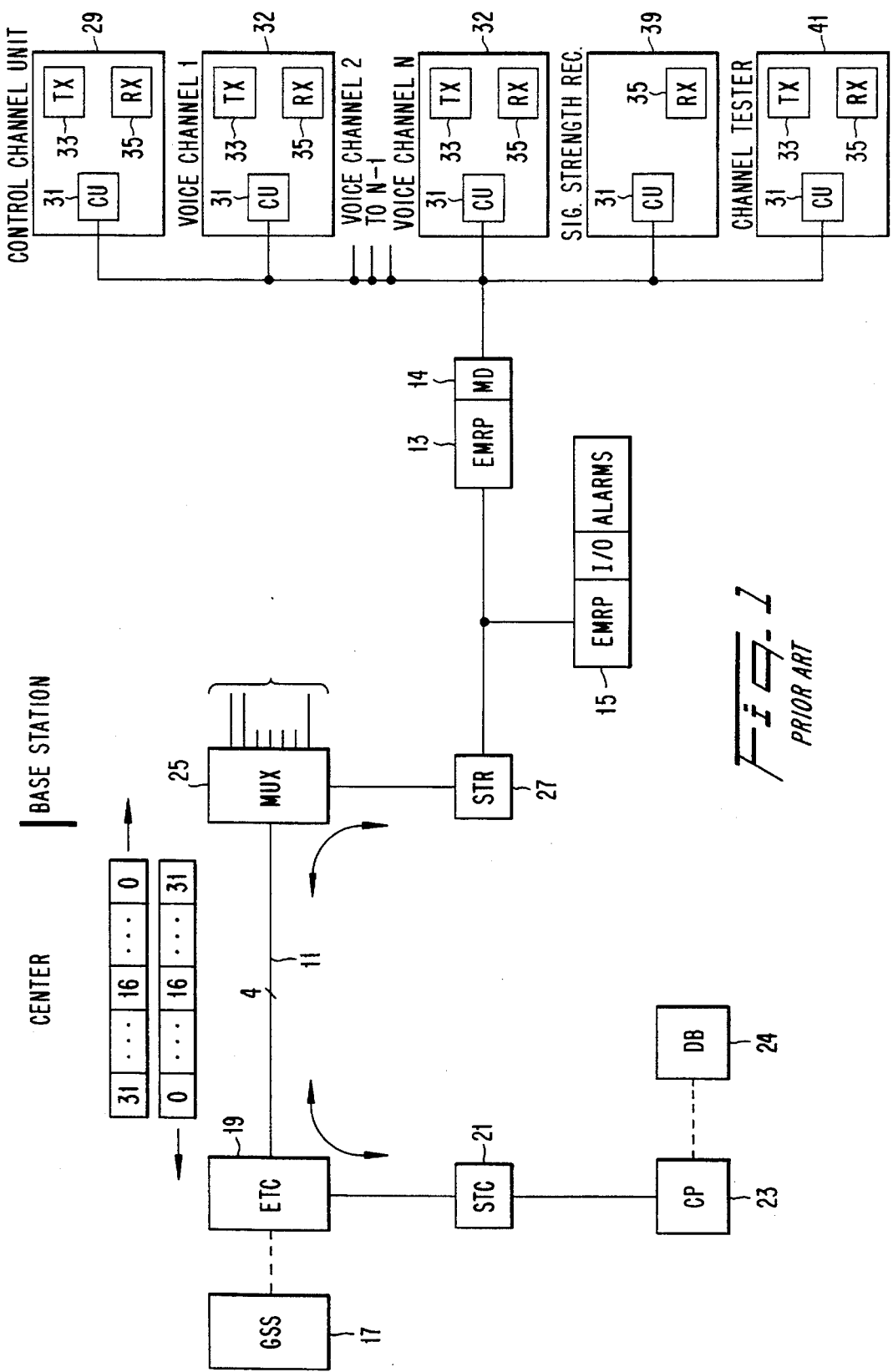
FIG. 1 is a block diagram of a mobile radiotelephone system.

Referring now to FIG. 1, control communications between a mobile switching services center and a base station of a known mobile radiotelephone system are carried out across a predetermined channel (in the U.S., typically channel 9) of a larger number of channels (in the U.S., typically 24) defined by respective PCM channels in time-division multiplex fashion. A communications frame including time slots allocated to each of the channels is exchanged between the mobile switching center and the base station on a four-wire line 11. PCM functions are handled by an exchange terminal circuit ETC 19 on the mobile services center side and by a multiplexer MUX 25 on the base station side. Data communications are formatted according to the CCITT 7 standard by a signalling terminal central STC 21 on the mobile services center side and a signalling terminal regional STR 27 on the base station side. Overall control of the mobile services center and the base station is performed by a central processor CP 23 of the mobile services center. Voice communications, however, are not directly handled by the central processor CP 23 but pass uninterrupted through the multiplexer MUX 25 and the exchange terminal circuit ETC 19 to a group switching subsystem GSS 17 for proper call routing. The CPU 23 has access to a subscriber records database 24 that may be located in the mobile switching center or may be remotely located in a Home Location Register (HLR).

The base station consists principally of a number of autonomous channel units typically including a radio transmitter TX 33 and a radio receiver RX 35 controlled by a control unit CU 31. In addition to a number N of voice channel units 37, there is provided a control channel unit 29, a channel tester unit 41 and a signal strength receiver unit 39, the latter unit having a control unit 31 and a radio receiver 35 but no transmitter. The control channel unit 29 is used to, among other things, set up calls across the various voice channels. The channel tester unit 41 allows trouble-shooting and diagnostics to be performed under control of the mobile services center.

The switching of messages among the various control units is performed by a regional processor EMRP 13 ("extension module regional processor") in cooperation with a message distributor MD 14. The EMRP 13 determines control unit addresses and scans the control units to see if a message is waiting. The message distributor puts messages into HDLC format and converts messages from a parallel format on the channel unit side to a serial format. An additional EMRP 15 is used to provide a human interface including a simple I/O terminal and various external alarms.

Figure 2:
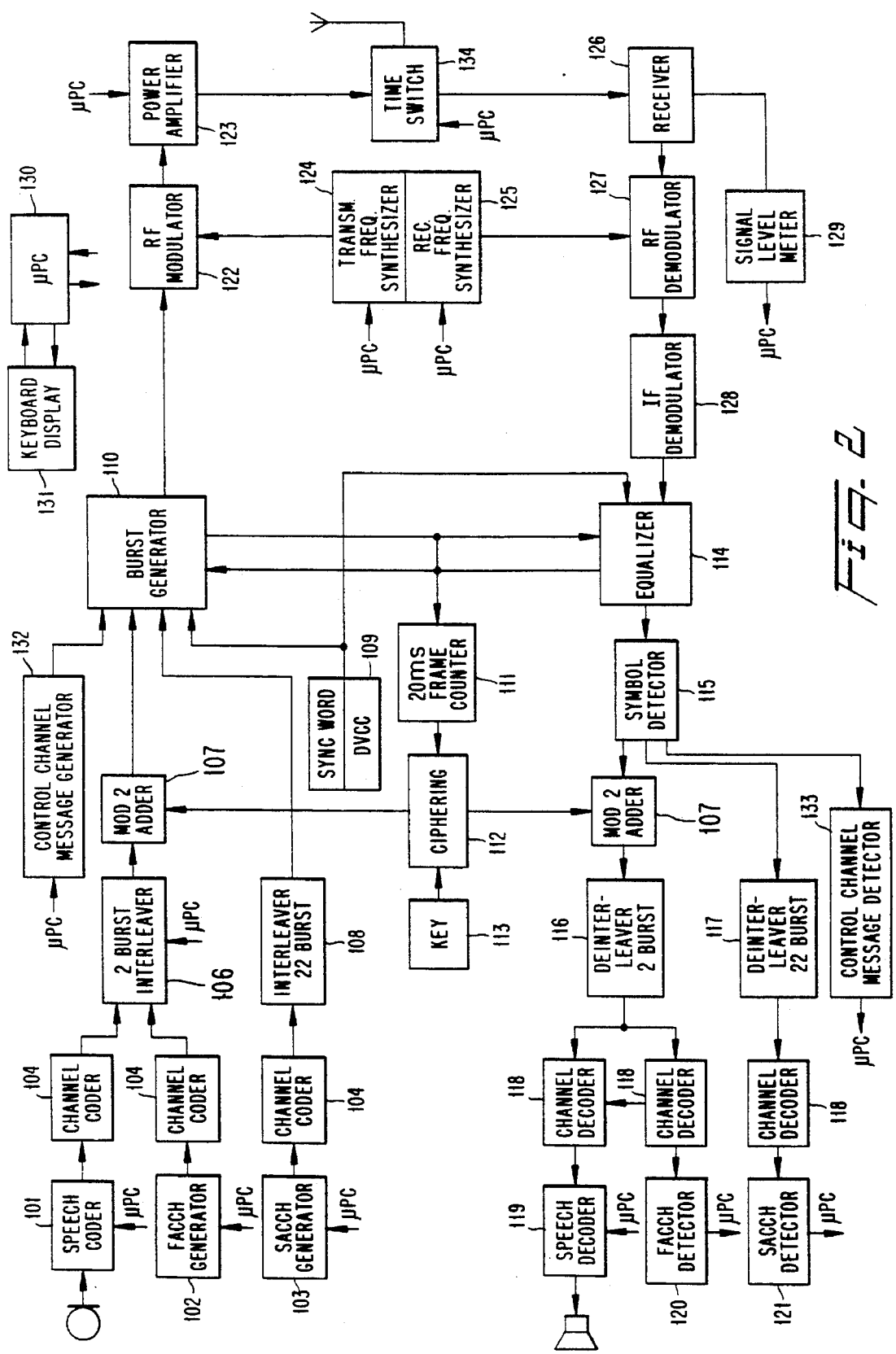
FIG. 2 illustrates a detailed block diagram of a mobile station that may be utilized in accordance with the present invention.

Referring now to FIG. 2, an embodiment of a mobile station that can be utilized in a cellular telephone system that operates in accordance with the present invention is illustrated. A speech coder 101 converts the analog signal generated by a microphone into a bit data stream. The bit data stream is then divided into data packages, according to the TDMA principle. A fast associated control channel (FACCH) generator 102 generates control and supervision signalling messages between the system and the mobile station and messages between the mobile station and the system. The FACCH message replaces a user frame (speech/data) whenever it is to be transmitted. A slow associated control channel (SACCH) generator 103 provides a continuous channel for the exchange of signalling messages between the base station and the mobile station and vice-versa. A fixed number of bits, e.g. twelve, is allocated to the SACCH for each time slot of the message train. Channel coders 104 are respectively connected to the speech coder 101, FACCH generator 102, and SACCH generator 103 for manipulating the incoming data in order to carry out error detection and correction. The techniques used by the channel coders 104 are convolutional encoding, which protects important data bits in the speech code, and cyclic redundancy check (CRC), wherein the perceptually significant bits in the speech coder frame, e.g. twelve bits, are used for computing a seven bit check.

A two-burst interleaver 106 is coupled to the channel coders 104 associated with the speech coder 101 and the FACCH generator 102, respectively. Data to be transmitted by the mobile station is interleaved over two distinct time slots. The 260 data bits, which constitute one transmitting word, are divided into two equal parts and are allotted two consecutive time slots. The effects of RAYLEIGH fading will be reduced in this manner. The output of the two-burst interleaver 106 is provided to the input of a modulo-two adder 107 so that the transmitted data is ciphered bit by bit by logical modulo-two addition of a pseudo-random bit stream.

The output of the channel coder 104 associated with the SACCH generator 103 is connected to a 22-burst interleaver 108. The 22-burst interleaver 108 interleaves data transmitted over SACCH over 22 time slots each consisting of 12 bits of information. The 22-burst interleaver 108 utilizes the diagonal principle so that as two SACCH messages are transmitted in parallel, the second message is displaced eleven bursts from the other message.

The mobile station further includes a Sync Word-DVCC generator 109 for providing the appropriate synchronization word (Sync Word) and DVCC which are to be associated with a particular connection. The Sync Word is a 28 bit word used for time slot synchronization and identification. The DVCC (digital verification color code) is an 8-bit code which is sent by the base station to the mobile station and vice-versa, for assuring that the proper channel is being decoded.

A burst generator 110 generates message bursts for transmission by the mobile station. The burst generator 110 is connected to the outputs of the modulo-two adder 107, the 22-burst interleaver 108, the Sync Word/DVCC generator 109, an equalizer 114, and a control channel message generator 132 generating channel coded control messages. A message burst comprising data (260 bits), SACCH (12 bits), Sync Word (28 bits), coded DVCC (12 bits), and 12 delimiter bits, combined for a total of 324 bits are integrated according to the time slot format specified by the standard EIA/TIA IS-54.

Under the control of the microprocessor 130, two different types of message bursts are generated by the burst generator 110: control channel message bursts from the control channel message generator 132 and voice/traffic message bursts. The control channel message is generated in accordance with commands from the microprocessor 130 and is sent on a digital control channel having the same burst formats as traffic channels but where the SACCH as well as the speech data normally generated in a voice/traffic burst are replaced by control information.

The transmitting of a burst, which is equivalent to one time slot, is synchronized with the transmitting of the other two time slots, and is adjusted according to the timing provided by the equalizer 114. Due to time dispersion, an adaptive equalization method is provided in order to improve signal quality. For further information regarding adaptive equalization techniques, reference should be made to U.S. Pat. No. 5,088,108 issued Feb. 11, 1992, and assigned to the same assignee. A correlator adjusts to the timing of the received bit stream. The base station is the master and the mobile station is the slave with respect to frame timing. The equalizer 114 detects the incoming timing and synchronizes the burst generator 110. The equalizer 114 is also operable for checking the Sync Word and DVCC for identification purposes.

A 20 ms frame counter 111 is coupled to the burst generator 110 and so is the equalizer 114. The frame counter 111 updates a ciphering code utilized by the mobile station every 20 ms, once for every transmitted frame. It will be appreciated that according to this particular example. According to EIA/15–54 (1.2), six time slots make up one frame with one full rate, the user being assigned two time slots in one frame. A ciphering unit 112 is provided for generating the ciphering code utilized by the mobile station.

A pseudo-random algorithm is preferably utilized. The ciphering unit 112 is controlled by a key 113 which is unique for each subscriber. The ciphering unit 112 consists of a sequencer which updates the ciphering code.

The burst produced by burst generator 110, which is to be transmitted, is forwarded to an RF modulator 122. The RF modulator 122 is operable for modulating a carrier frequency according to the $\pi/4$ DQPSK method ($\pi/4$ shifted, Differentially Encoded Quadrature Phase Shift Keying). The use of this technique implies that the information is differentially encoded, i.e. 2 bit symbols are transmitted as four possible changes in phase; $+\pi/4$ and $+3\pi/4$. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123. The RF power emission level of the carrier frequency is selected on command by a microprocessor controller 130. The amplified signal is passed through a time switch 134 before it reaches the antenna. The timing is synchronized to the transmitting sequence by the microprocessor controller 130.

A receiver carrier frequency is generated in accordance with the selected receiving channel by receiving frequency synthesizer 125. Incoming radio frequency signals are received by receiver 126, the strength of which are measured by signal level meter 129. The received signal strength value is then sent to the microprocessor controller 130. An RF demodulator 127 which receives the receiver carrier frequency from the receiving frequency signal from receiver 126, demodulates the radio frequency carrier signal, thus generating an intermediate frequency. The intermediate frequency signal is then demodulated by an IF demodulator 128, which restores the original $\pi/4$-DQPSK-modulated digital information.

The restored digital information provided by IF demodulator 128 is supplied to the equalizer 114. A symbol detector 115 converts the received two bit symbol format of the digital data from the equalizer 114 to a single bit data stream. The symbol detector 115 in turn produces three distinct outputs. Control channel messages are sent to a control message detector 133 which supplies channel decoded and detected control channel information to the microprocessor controller 130. Any speech data/FACCH data is supplied to a modulo-two adder 107 and a two-burst deinterleaver 116. The speech data/FACCH data is reconstructed by these components by assembling and rearranging information from two consecutive frames of the received data. The symbol detector 115 supplies SACCH data to a 22-burst deinterleaver 117. The 22-burst deinterleaver 117 reassembles and rearranges the SACCH data, which is spread over 22 consecutive frames.

The two-burst deinterleaver 116 provides the speech data/FACCH data to two channel decoders 118. The convolutionally encoded data is decoded using the reverse of the above-mentioned coding principle. The received cyclic redundancy check (CRC) bits are checked to determine if any error has occurred. The FACCH channel coder furthermore detects the distinction between the speech channel and any FACCH information, and directs the decoding accordingly. A speech decoder 119 processes the received speech data from the channel decoder 118 in accordance with a speech decoder algorithm (VSELP), and generates the received speech signal. The analog signal is finally enhanced by a filtering technique. Messages on the fast associated control channel are detected by FACCH detector 120, and the information is transferred to the microprocessor controller 130.

The output of the 22-burst deinterleaver 117 is provided to a separate channel decoder 118. Messages on the slow associated control channel are detected by SACCH detector 121, and that information is transferred to the microprocessor controller 130.

The microprocessor controller 130 controls the mobile station activity and the base station communication, and also handles the terminal keyboard input and display output 131. Decisions by the microprocessor controller 130 are made in accordance with received messages and measurements made. The keyboard and display unit 131 enable an information exchange between the user and the base station.

FIG. 3 illustrates an embodiment of a base station that can be utilized in a cellular telephone system that operates in accordance with the present invention. The base station incorporates numerous component parts which are substantially identical in construction and function to component parts of the mobile station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, minor distinction between the mobile and base stations. For instance, the base station has two receiving antennas. Associated with each of these receiving antennas are a receiver 126' an RF demodulator 127', and an IF demodulator 128'. Furthermore, the base station does not include a user keyboard and display unit 131 as utilized in the mobile station. Another difference is that a base station handles the communication of many mobiles, which can be seen from the provision of three channel handlers 1, 2, 3, each of which handles one out of 3 time slots of one frequency.

Referring now to FIG. 4(a–c), priority operation of the mobile radiotelephone system will be explained. Although operation will be described in terms of an incoming call to the mobile exchange from the public telephone network, operation in the case of an outgoing call and in the case of a mobile-to-mobile call will be readily apparent to those skilled in the art, and modification of a central software program run by the CPU 23 of the mobile switching center in order to implement the flow of operations of FIG. 2 is also within the level of ordinary skill in the art of stored-program-control telephone systems.

Figure 4A:
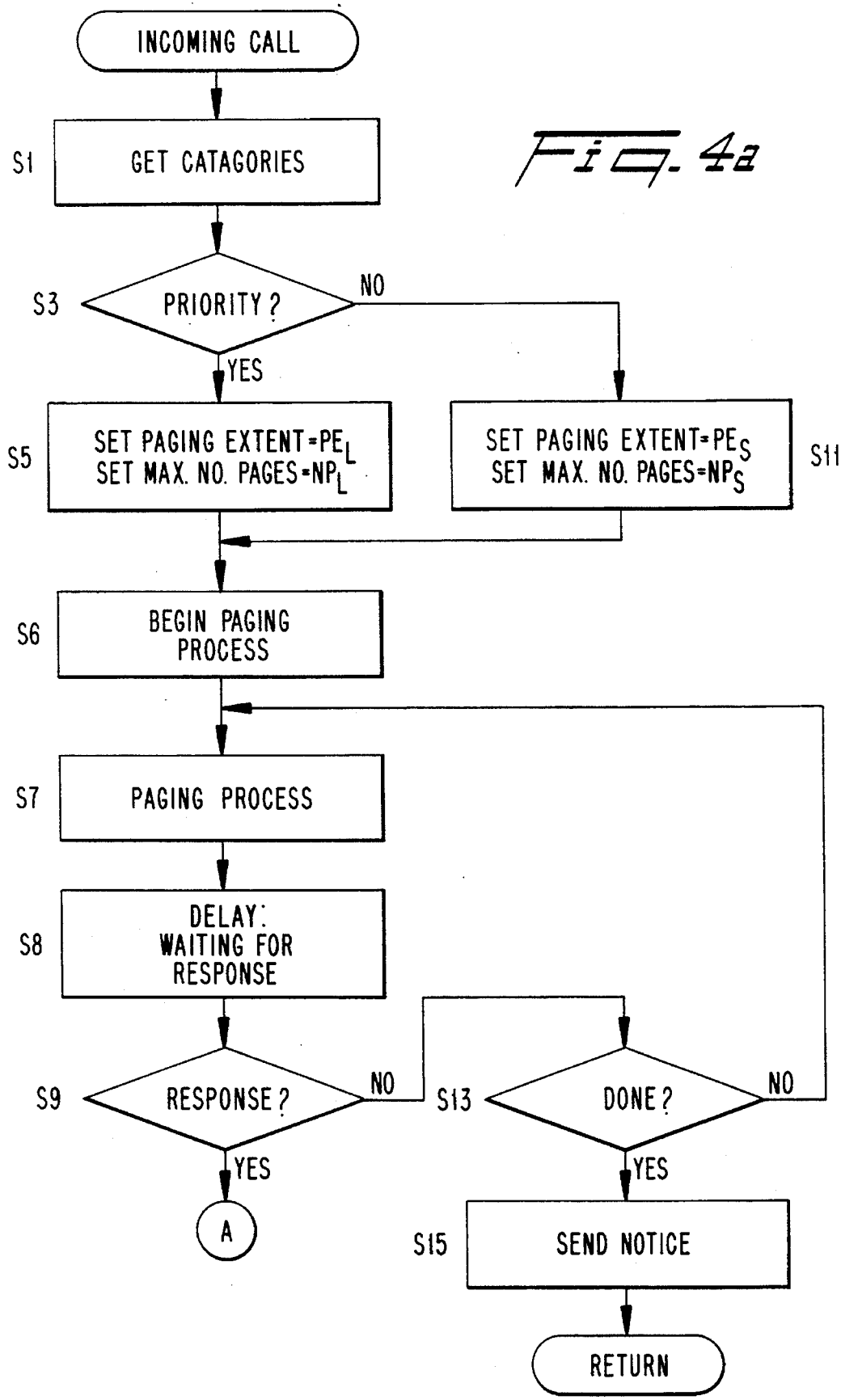
FIGS. 4a, 4b and 4c, is a flowchart illustrating priority operation of the mobile radiotelephone system according to a preferred embodiment of the present invention.

Referring first to FIG. 4a, whether or not a call is to be treated as a priority call is determined in Step S1 by retrieving subscriber category information from a database. Priority status may be accorded based on the telephone number of either the "A" (originating) party, or the "B" (answering) party. Subscriber category information designating the party as being entitled to priority status may be stored in the subscriber records database 24 in FIG. 1. Typically, call priority will be offered as a subscriber service which is provided at some premium. Telephone numbers of emergency service entities (police, fire department, etc.), however, are routinely designated as having priority. Furthermore, calls needing handoff may be designated as priority regardless of subscriber identities, especially if the need for handoff is urgent to avoid dropping the call. Based on the results of an examination of the subscriber categories and the voice/traffic channel seizure type (e.g., directed retry, handoff), if the call is determined in Step S3 to be a priority call, parameters governing how exhaustively the B party mobile subscriber will be paged are set. In the case of a priority subscriber, a parameter PE governing the geographical extent of paging is set to a value $PE_L$ indicating a larger paging extent, and a parameter NP governing the maximum number of pages allowed to be performed is set to a value $NP_n$ indicating a relatively larger number of pages. These parameters are set in Step S5. If the call is not a priority call, the paging extent parameter is set to $PE_s$, indicating a relatively smaller geographic extent and the maximum pages parameter is set to $NP_s$, indicating a relatively smaller number of pages. These parameters are set in Step S11. Thereafter, the paging process is begun in Step S6 and continues during Step S7. A delay then occurs as a response is listened for in Step S8. If the mobile subscriber does not respond by the time a paging process in accordance with the designated parameters time ($PE_L$ and $NP_L$ for a priority call or $PE_s$ and $NP_s$ for a non-priority call) has been completed as detected in Step S13, then notice is sent in Step S15 that the mobile subscriber cannot be located, and the call handling program returns.

Alternatively, control of the extent to which a mobile station is paged may be distributed throughout the different exchanges comprising the system in a multiple-exchange paging environment. Paging priorities may be evaluated by an exchange that receives page requests from another exchange where a page request is received such that operators of the different exchanges have control over the amount of potentially wasted pages generated from outside the exchange. For example, when a paging request is sent to a visiting exchange, the request may include, inter alia, two things: the paged subscriber's priority class (SPRI), for example in the range 0–6; and, the page request's uncertainty list rank (ULR), ranging from X (where the subscriber is believed to be based on past registrations) to zero (the most uncertain of the possible locations).

Each visiting exchange may relate the foregoing two received parameters to a set of actions, such as varying the extent of the page from wide to narrow or, in the extreme case, denying the page request. If a page is carried out, the result of the page is returned to the requesting exchange which, if the result is negative, may initiate a subsequent page with a lower level of uncertainty, having acquired information concerning where the mobile station is not located.

Delay for priority users may be further minimized in conjunction with paging by employing queue management of paging queues. Individual paging queues are located at each base station, and a serving queue for all the base stations of an exchange is located at each exchange. By employing queue management in view of priorities in a similar manner as in voice channel handling, to be presently described, priority users will come to the head of the queue and have their pages executed more quickly.

Figure 4B:
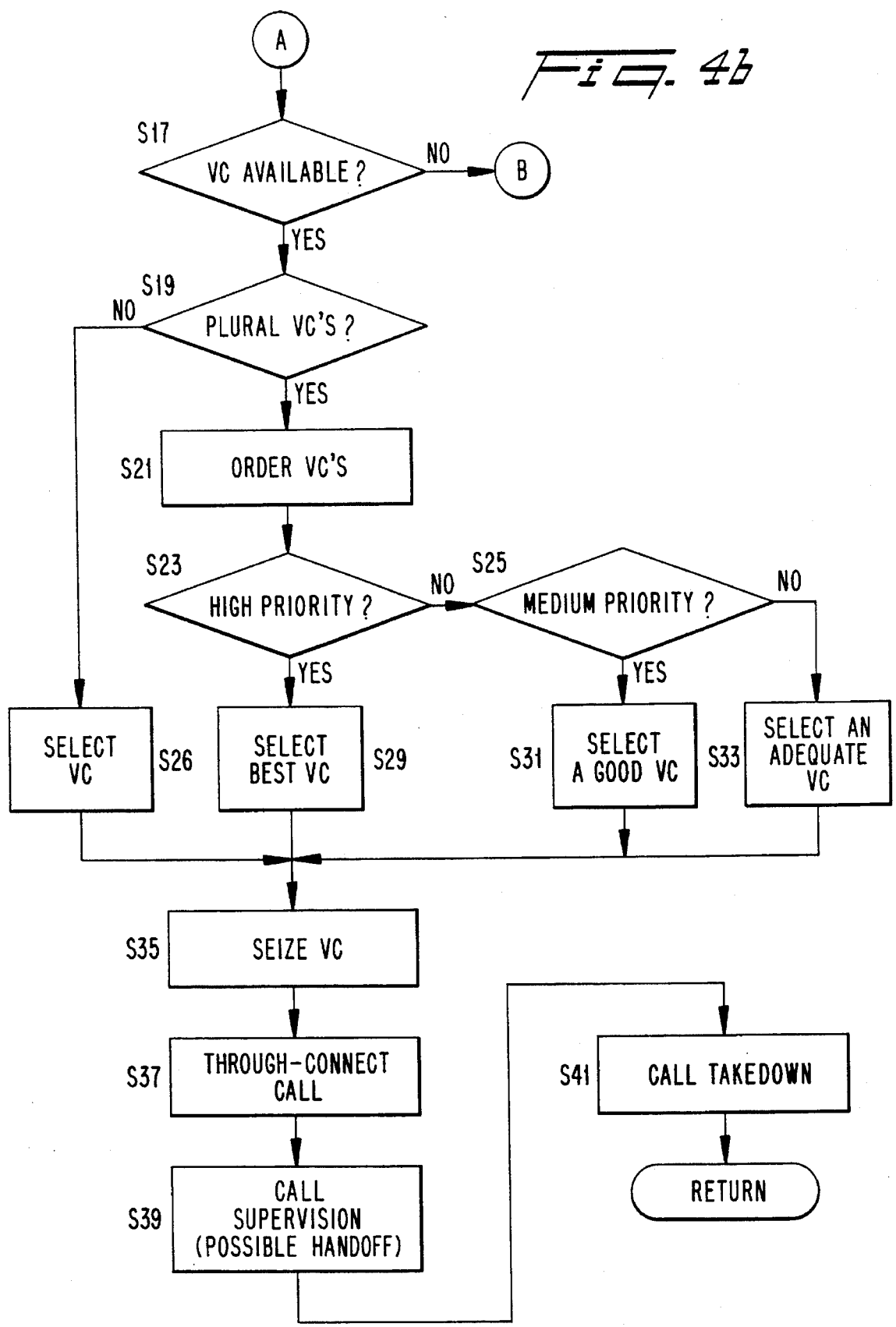
Figure 4C:
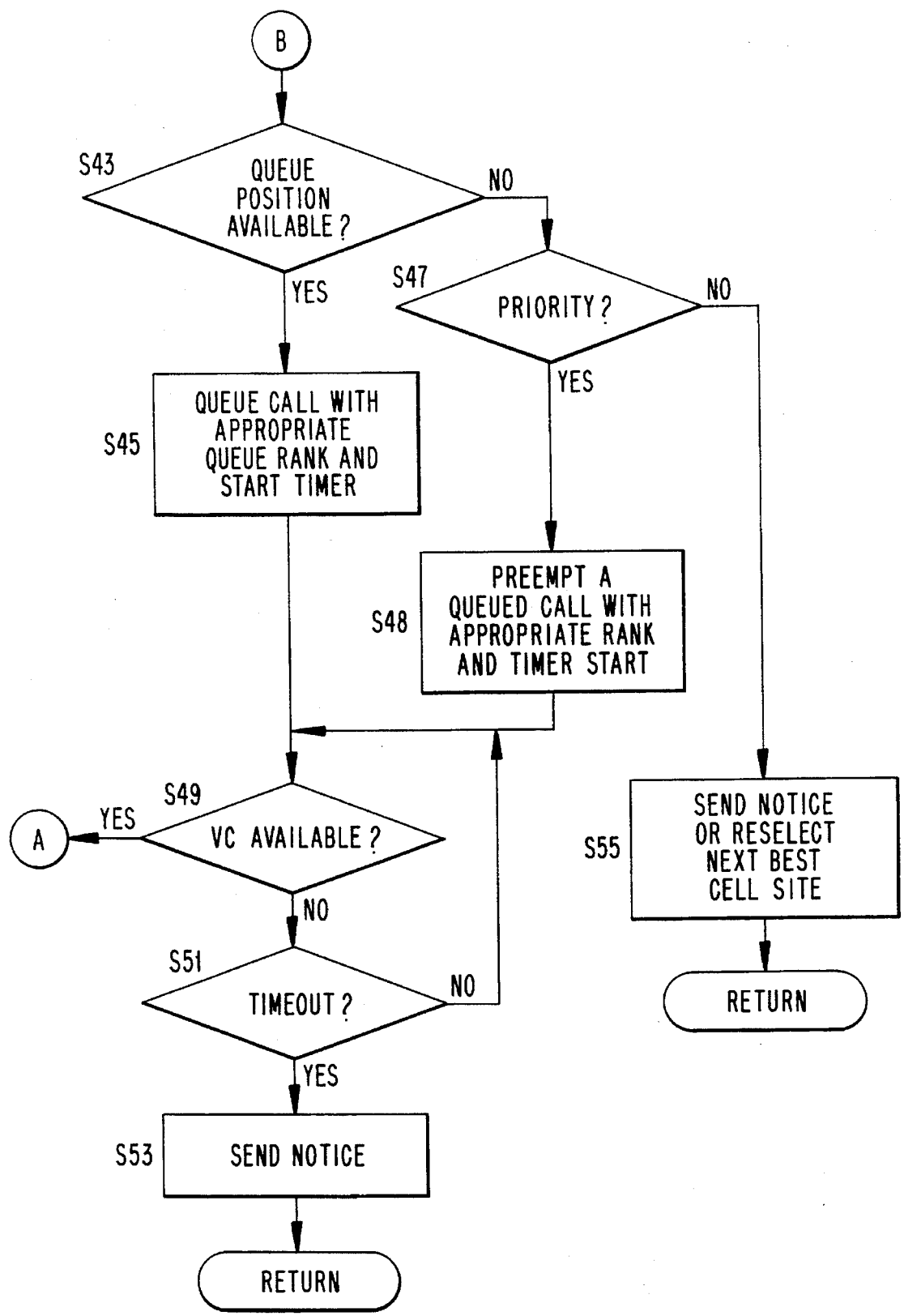

Referring now to FIG. 4b, when the mobile subscriber does respond, it is next ascertained in Step S17 whether one of the voice channels (VC) assigned to the corresponding base station is available to service the call. If a voice channel is not available, and if a queue position is available as determined in Step S43 (FIG. 4c), then the call request will be placed in a queue in the memory (not shown) of the central processor 23 of FIG. 1 for up to a predetermined period of time awaiting the next available voice channel. For example, a call setup (first try) could have a maximum queue time of 4 seconds whereas a call handoff could queue for a maximum of 6 seconds. If a voice channel does not become available during the predetermined period of time (S49, S51), notice is sent to the A party in Step S53 that the call cannot be serviced at the present time. A request may remain in the queue for up to several seconds before a reply to the caller is required, at which time the request is withdrawn from the queue.

Preferably, the queue is not operated on a strictly FIFO basis. Instead, queue management is performed by the CPU to assign each queue entry a queue ranking and priority and to update it periodically, taking into consideration the mobile station's priority based on the called or calling number, the need for a channel from a radio perspective (e.g., to prevent dropped calls), and the time a queue entry has already spent in the queue. Priority calls will therefore preempt other queue entries, all other things being equal. Thus in Step S47, if the call is determined to be a priority call then it is allowed to preempt a queued call with a lower rank as shown in Step S48, and the queue timer is started. If the call is not a priority call, then notice of the present unavailability of service is sent to the requestor in Step S55 in the form of a handoff cell reselection, a directed retry or reorder message. (In the case of directed retry, the mobile may attempt access on the next best cell site.) Such an approach effectively manages both subscriber priorities and system priorities.

In an illustrative embodiment, queuing priority is calculated as QPRI=k0*TIQ+k1*SPRI+k2*SEIT where TIQ represents time-in-queue, SPRI represents subscriber priority, SEIT represents seizure type (e.g., initial access, directed retry access, handoff) and k0, k1, and k2 are constants that may be adjusted as desired. Directed retry accesses can be a higher-number seizure type than an initial access, resulting in a higher queuing priority. Handoffs may be classified as different seizure types according to a degree of urgency of the handoff. Queue entries are periodically ranked according to the above queuing priority and only the top N entries are kept.

Referring to FIG. 4b, when a voice channel has been found (S17), if no more than one voice channel is available (S19), that channel may be immediately seized and used to set up the call (S27,S35). If plural voice channels are available, however, in the case of a priority call, further checking is performed to see whether a better voice channel might be available. Therefore if more than one channel is available, then the voice channels are ordered according to one or more performance criteria (S21), and one of the available voice channels in terms of the criteria is selected to be seized on behalf of the call according to its priority. If the call is high priority (S23), then the best one of the available voice channels in terms of the criteria is selected in Step S29 to be seized on behalf of the call in Step S35. If the call is not high priority, then if the call is medium priority (S25), a good channel in terms of the criteria is selected and seized (S31,S35). If the call is neither high priority nor medium priority (no priority) then only an adequate voice channel is selected and seized (S33,S35).

A number of different techniques may be used for evaluating the performance of the voice channels. For example, a history may be kept of the call quality of the several most recent calls using a particular voice channel. In case of an analog channel, quality may be measured in terms of a signal-to-noise ratio and/or carrier-to-interference ratio (the higher the ratio the better), and in case of a digital channel, quality may be measured in terms of carrier-to-interference ratio, bit error rate or possibly frame error rate (the lower the rate the better). An indication of the average call quality may then be calculated and used as a proxy for "how good" a channel is likely to be.

The actual performance of the channel for a particular call will of course depend on the location of the mobile subscriber. For example, if a particular channel is used to establish in succession a number of calls close to the base station of the cell, where interference is typically lower assuming that the co-channel and adjacent channels are in use, and that same channel is then used to establish a call near the periphery of the cell, call quality in the latter instance will be less than that experienced by the previous close-in calls. Call quality should therefore be averaged over a statistically significant number of calls (for example, ten or more) to yield a truly typical quality value.

Apart from or in combination with such monitoring, penalties may also be associated with particular voice channels in the main memory of the CPU 23 upon the occurrence of certain deleterious events in the course of the channel's performance. The penalties may be "worked off" over time during the course of satisfactory channel performance. Penalties may be assessed, for example, for sudden loss of call quality, failure to successfully complete a call handoff, etc.

By ordering the available voice channels in terms of a suitable performance criterion evaluated over the course of a number of previous calls and selecting the best channel for use by a priority call, priority calls are assured the best available service. This type of signal-quality-based ordering is to be distinguished from a signal-strength-based ordering commonly carried out in cellular mobile radiotelephone systems to determine the relative proximity of a mobile station to different base stations for purposes of handoff.

In an illustrative embodiment, ranking of voice channels is performed according to predicted C/I ratios. Such ranking allows a common ranking criterion to be used for both analog and digital channels. Essentially, a good approximation of the likely C/I radio on a new channel may be determined by dividing signal strength on the channel occupied by the mobile station (compensated to account for differences in transmission power) by signal strength on an idle channel under consideration. In the case of handoff, the channel occupied by the mobile station will be the pre-handoff traffic channel, and in the case of a new access, the channel occupied by the mobile station will be a control or access channel. In the logarithmic (decibel) domain, this calculation may be represented as:

C/I (new channel)=SS (comp. old chn)−SS (idle)

These C/I values may then be used to sort the channels into an idle list with at least two and possibly three or more regions. In an illustrative embodiment, the list is divided into three regions, a highest region containing idle voice channels that are predicted to give an acceptable C/I ratio for the current call, a middle region containing voice channels predicted to give an unacceptable C/I ratio for the current call, and a lowest region deemed unusable, or "sealed", for all calls for any value of "C".

In an illustrative embodiment, a channel is selected from region 1 for the current call according to a selected channel index SCI calculated as:

SCI=round[($k_4$*SPRI+$k_5$)*HACR)]

if SCI>HACR then SCI:=HACR where SPRI again represents subscriber priority, HACR represents the rank of the channel with the best acceptable C/I (highest available channel rank), and $K_4$, $K_5$ are constants that may be adjusted as desired.

To reduce the signaling load between the base station and the mobile switching center in order to maintain current C/I lists, changes in "I" may be sent to the mobile switching center not on a regularly sampled basis but only when changes are judged to be statistically significant. For example, when no valid value of "I" is available, which is the case following a call disconnection, device reset or power on, the channel can be linked either to the sealed or idle lists. After a specific number of channel measurements have been performed, the (mean) value of "I" is sent to the MSC. This value is stored and associated with the channel until a new value is received or time supervision occurs in which "I" is marked invalid. In the base station a type of two-sided hypothesis testing is constantly performed to see if the "I" has significantly changed based on recent signal strength measures. If a significant change does occur then a signal is sent and the previous value is replaced.

Once a voice channel has been seized for the call, the call is then through-connected in Step S37, following which call supervision is performed throughout the duration of the call in Step S39 wherein the call may be changed to a different channel, if available, if call quality becomes unacceptably degraded. At the conclusion of the call, call takedown is performed in Step S41 wherein a record allocated to the call is deleted by the CPU 23, and the call handling routine concludes.

By giving priority calls various different kinds of preferential treatment, system performance may be significantly increased for such priority calls. In the preferred embodiment, priority calls are provided priority access to voice channels using queuing techniques and are furthermore assigned the best available voice channel based upon performance history. In addition, more exhaustive paging is performed for priority calls than for non-priority calls. Priority calls may be favored in other similar ways to assure the best possible call handling.

It will be appreciated by those of ordinary skill in the art that the present invention can be embodied in other specific forms without departing from the spirit or other essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A call request handling method in a mobile radiotelephone system wherein a plurality of mobile stations communicate with a base station through an air interface across defined channels, comprising the steps of ascertaining whether a call is to be given priority;

assigning said channels preferentially to a call when it is ascertained that said call is to be given priority;

providing for more extensive paging of a mobile station including paging over a wider geographic extent than would be allowed if said priority call were not given priority;

through-connecting said priority call;

maintaining a paging queue; and preempting a queued paging request in favor of a paging request of higher priority.

2. A method of providing priority call set-up handling in a cellular mobile radiotelephone system, wherein a plurality of mobile stations communicate with a base station through an air interface across defined channels, said channels being categorized in at least a first channel category with high quality and a second channel category with adequate quality, said method comprising the steps of:

ascertaining whether a call to one of said mobile stations is to be given a priority selected from a group consisting of at least a higher priority and a lower priority as determined by subscriber category information;

paging a mobile station intended for said call given one of said priorities in order to assign a voice channel of one of said at least first and second categories;

determining whether said call has been given one of said priorities;

selecting a channel of said first category if said call has been given said higher priority and selecting a channel of said second priority if the call has been given said lower priority;

queuing said call given one of said priorities according to said given priority when a channel is not available, wherein said step of queuing said call given one of said priorities further comprising the step of;

preempting a queued call with said call given one of said priorities when a queue position is not available.

3. A method of providing priority call set-up handling in a cellular mobile radiotelephone system, wherein a plurality of mobile stations communicate with a base station through an air interface across defined channels, comprising the steps of:

ascertaining whether a call to one of said mobile stations is to be given priority based on subscriber category information;

providing for a first and second category of paging parameters, one parameter in each category indicating the paging extent and another parameter in each category indicating the number of paging repetitions, the parameters of said first category indicating a greater paging extent and an equal or greater number of paging repetitions than the corresponding parameters of said second category;

paging said mobile station intended for said call given said priority in dependence on said first category of paging parameters;

assigning one of said channels to said mobile station upon a response on said paging from that mobile; and through-connecting said priority call.

4. A method for providing priority call set-up handling in a cellular mobile radiotelephone system, wherein a plurality of mobile stations communicate with a base station through an air interface across defined channels, said channels being of at least a first channel category with high quality and a second channel category with adequate quality, comprising the steps of:

ascertaining whether a call to one of said mobile stations is to be given a priority selected from a group of priorities consisting of at least a higher priority and a lower priority as determined by subscriber category information;

providing for a first and second paging category of paging parameters indicating the paging extent and the maximum number of paging repetitions, the parameters of said first paging category indicating a greater paging extent and an equal or greater number of paging repetitions than the corresponding parameters of said second paging category;

paging said mobile station intended for said call given one of said priorities in dependence on said first paging category of paging parameters and to such an extent given by the first paging category if the call has been given one of said priority;

determining whether said call has been given said higher priority or said lower priority;

selecting a channel of said first channel category if said call has been given said higher priority and selecting a channel of said second channel priority if the call has been given said lower priority; and through-connecting said priority call.

\* \* \* \* \*